United States Patent [19]

Burger et al.

[11] 4,065,937
[45] Jan. 3, 1978

[54] METHOD TO TRANSFER HEAT OR REFRIGERANT AND HEAT PUMP FOR PRACTICAL APPLICATION OF THIS METHOD

[76] Inventors: Manfred R. Burger, Wolfratshauser Str. 45, 8023 Pullach; Ernst Gagel, Karwendelstrasse 49, 8000 Munich 70; Rudolf Kalmovicz, Stadtweg 25, 8059 Altenerding; Alfred Prechtl, Lindenweg 6, 8082 Grafrath, all of Germany

[21] Appl. No.: 651,103

[22] Filed: Jan. 21, 1976

[30] Foreign Application Priority Data

Dec. 11, 1975 Germany .............................. 2555887
Sept. 25, 1975 Germany .............................. 2542728

[51] Int. Cl.² ........................ F25D 17/06; F25B 13/00
[52] U.S. Cl. ........................................ 62/89; 62/324
[58] Field of Search .................. 62/89, 324, 325, 177, 62/282

[56] References Cited

U.S. PATENT DOCUMENTS

| 2,180,634 | 11/1939 | Hubacker | 62/89 |
| 2,794,332 | 6/1957 | Boss | 62/89 |
| 3,076,321 | 2/1963 | Schlichtig | 62/89 |

*Primary Examiner*—Lloyd L. King
*Attorney, Agent, or Firm*—Pollock, Vande Sande & Priddy

[57] ABSTRACT

The invention relates to a method for the transfer of heat or refrigerant between two separate flows of fluid, by means of a heat pump incorporating a refrigeration cycle. The refrigeration cycle comprises an evaporator, a compressor, a condenser and a regulating valve, the evaporator and the condenser being adapted for heat exchange with the two separate fluid flows. During a heating operation, one of the fluid flows, before entering the evaporator, is brought into heat exchange in a first heat exchanger with the refrigeration cycle between the condenser and the regulating valve.

3 Claims, 16 Drawing Figures

METHOD TO TRANSFER HEAT OR REFRIGERANT AND HEAT PUMP FOR PRACTICAL APPLICATION OF THIS METHOD

The invention relates to a method to transfer heat or refrigerant within two separate flows of fluid with the aid of a heat pump which comprises a refrigeration cycle with an evaporator, a condenser and a regulating valve, whereby the evaporator and the condenser can accomplish a heat exchange with the separate flows of fluid. The invention further relates to a heat pump for the carrying out this method.

Heat pumps of various designs for heating and cooling purposes are known. They include a closed refrigeration cycle with a condenser and an evaporator. The condenser and the evaporator act as heat exchangers. The evaporator removes from its surroundings the heat necessary to vaporize the circulating refrigerant. The refrigerant is then compressed in its vapor state with the aid of the compressor, and is then liquified in the condenser at a higher pressure and temperature level. During this process of condensation, the latent heat is released and delivered to the surroundings. If, for example, a heat pump is used as a device to heat the interior of a building, the evaporator will be located at the outside of the building in heat exchange with the surrounding air, with the condenser being placed inside the building in heat exchange with the air indoors.

A heat pump offers the great advantage that the energy required for the operation of this pump, for example electrical energy, is not directly converted into an output of heat but is used solely to drive the compressor, and possibly some auxiliary equipment. If energy is converted directly into a heating effect, the ratio of delivered heating performance to expended energy can never exceed the coefficient in the case of heat pumps, it can be three- or four-fold greater since energy is expended only to deliver or "pump" available heat from one location to another.

Therefore, heat pumps do contribute significantly to the conservation of energy, and and will not contaminate the atmosphere with any combustion residues, an advantage over standard methods which generate heating energy by means of combustion.

Since heat pumps in air-conditioning installations are normally used for cooling as well as heating purposes, the refrigeration cycle will be reversible in standard systems. In other words, it must be possible to operate the evaporator and the condenser interchangeably as condenser and evaporator. A change-over mechanism is therefore needed which will permit the selective connection of the discharge, or respectively, the intake side of the compressor with either one of the heat exchangers (condenser or evaporator). Such changeover mechanism will comprise, in addition to an intricate four-way valve, check valves to control the direction of circulation, quantity regulators and other complicated governing units for the control of the heating or cooling operation. While heat pumps normally consist of components which are relatively simple and resistant to failure, the above-described change-over mechanism is costly and difficult to manufacture, greatly subject to wear and tear as well as malfunctions, so that specially trained personnel are needed for manufacture, assembly, installation as well as maintenance, making it impossible to mass-produce such heat pumps in an inexpensive and simple manner. Known air-conditioning units have the additional disadvantage that, for use in compact, single housing installations, they require, being designed in a compact, a opening in the outer wall of the building, so that one heat exchanger can be located on the outside, and the other on the inside of the building. Furthermore, since only a limited number of areas in the outer wall of a building are suitable for such installation, it will not always be possible to select an optimum location for the inside heat exchanger. If heat pumps are produced in the form of split aggregates, with the heat exchangers placed in separate housings, it becomes necessary to assemble the refrigeration cycle system at the place of installation and to bridge the span between the two components, which also involves careful and complete insulation. Both solutions have the disadvantage that the heat exchangers on the inside are at a specific and fixed location and will provide a heating or cooling output at this location only, so that it will usually be impossible to provide uniform air-conditioning in all interior areas.

It is the object of the invention to provide a method, and a heat pump of the above-described type, in which the heat pump can be produced in a simple manner and at low cost, and is designed in the form of a compact unit which is sturdy, not subject to frequent breakdowns, easily installed and maintained, and which -as a special feature- is portable and can be installed at various locations, operates at a high degree of efficiency and adapts to existing conditions to an optimal extent. According to the invention, this problem is solved by using the method above described characterized in that the refrigeration cycle operates steadily and in the same direction, and that the separate flows of fluid are brought to heat exchange with the evaporator and the condenser interchangeably to attain either heating or cooling operation.

This specific method makes it feasible to design a heat pump in the form of a compact unit without the need of providing a large opening through the outer wall. It will now be sufficient to conduct the outside air into the interior of a room through pipes or tubes. Such pipes or tubes only require wall openings of approximately 10 cm diamater. This method offers the particularly important advantage that it makes unnecessary the change-over mechanism for the reversal of the refrigeration cycle because this cycle will always maintain its direction of rotation. Condenser and evaporator will always function as condenser and as evaporator so that they can be constructed in an optimum manner in accordance with their specific function. In case of the standard, known units the function of the heat exchangers will change upon the conversion from heating to cooling operation, or vice versa. The switching of the two flows of fluid from condenser to evaporator and vice versa, as proposed by the invention, can be accomplished constructively by the use of very simple means. The assembly of the heat pump proposed by the invention is not complicated and does not require specially trained personnel.

Since the refrigeration cycle is a closed unit which operates in one mode always, it can be installed in light-weight, portable housings which can be inserted in any desired location. The bridging of the distances involved is accomplished with the aid of the two flows of fluid, and not with the aid of the tubings of the refrigeration cycle. By a proper and varied conduit of the flows of fluid, and possibly by the use of several compact and inexpensive heat pumps, it becomes possible to deliver the heating or cooling output at various points of a building, or a room within the building, as desired. It is also possible, for example, to return outside air to the outside and to deliver inside air to the interior, and it is also possible, in summer, to cool off the outside air by heat exchange with the evaporator and to deliver this air to the inside, and to exhaust inside air, drawn from inside. In the latter case the air change per hour can be so dimensioned that it amounts to eight times of the cubic room capacity, meeting the ventilating requirements for public places such as inns. The outside air, or in the latter case the inside air, can be removed to the outside also through already existing ducts instead of specially arranged conduits.

If this type of two-way air change is used, it will be particularly advantageous at the time of cooling operation, to place the refrigeration cycle of the heat pump inside the room to be cooled because the condenser, in heat exchange with the used-up inside air, will then be at a substantially lower temperature than it would be if it were placed at the outside of the building and in heat exchange with the generally warmer outside air. As a result thereof, the coolant reaching the evaporator and the compressor by way of the regulating valve will likewise have a lower temperature, thus improving not only the degree of efficiency of the refrigeration cycle overall, but reducing also the power demand on the compressor, as will be explained later on in detail.

The versatility of the heat pump according to the invention makes it possible to utilize the heat released during the cooling process at any location desired for heating purposes, for example to heat up water in the bath room, and to use the refrigerant obtained during the heating process for the operation of a refrigerator or the like.

The heat pump of the invention comprises a refrigeration cycle with an evaporator, a compressor and a regulating valve, where the evaporator and the condenser can accomplish a heat exchange with separate flows of fluid for the transfer of heat or refrigerant from one fluid flow to the other fluid flow, and the heat pump is characterized by the features that the refrigeration cycle operates steadily and in the same direction for heating as well as cooling operations, and that the separate flows of fluid are each brought to heat exchange with the evaporator and the condenser interchangeably.

One significant characteristic of the invention, applicable to all heat pump species of this application and to any other heat pumps, is the extraordinarily advantageous feature that during heating operation the fluid flow being guided to the evaporator is brought into heat exchange prior to its entry into the evaporator with the refrigeration cycle between condenser and regulating valve within the counterflow cooler or heat exchanger. It is known in refrigeration installations to cool the refrigeration cycle after its passage through the condenser by an externally fed coolant. It is also known in such installations to accomplish this cooling in the form of a so-called "internal" heat exchange, namely, by bringing into heat exchange the refrigeration cycle between evaporator and compressor with the refrigeration cycle between condenser and regulating valve. The additional cooling produced by this step will lower the energy losses caused by the valve effect, and increase correspondingly the cooling output delivered to the cold storage space. The thermodynamic interrelationships can be proven, but they are known in connection with refrigeration installations and are not the subject of the invention.

Contrary to prior art theories, the invention proposes to carry out a cooling of the refrigeration cycle between condenser and regulating valve especially during heating operations. Contrary to known processes, the principal aim is not to increase the cooling performance of the evaporator, because this refrigerant is utilized at best as a by-product only. It was found, rather that such cooling of the refrigeration cycle will result in three extraordinarily important advantages, and especially during heating operations, as will be explained here in detail:

1. The fluid conveyed from outside the building and brought into heat exchange with the refrigeration cycle is heated during the course of the heat exchange in accordance with the rate of flow, thus making it feasible to utilize in the heat exchanger, which includes the evaporator, a greater temperature difference between the fluid conveyed from the outside and the fluid returned to the outside. This has the same effect as an increase in the outside temperature, and obviously results in the improvement of the efficiency of the heat pump. It is especially important that the heat generated by the cooling of the refrigeration cycle can be utilized directly and with positive results within the system.

2. By lowering the temperature of the coolant upstream of the regulating valve, and thus upsteam of the evaporator, the thermo-dynamic effectiveness or "pump effect" of the heat pump can be significantly improved, as shown by the following example:

Assuming a temperature of 5° C for the fluid conveyed from outside, and reduced to 0° C after heat exchange with the evaporator, so that the refrigeration cycle will have a temperature of approximately 0° C upon leaving the evaporator. It is further assumed that the coolant after leaving the condenser has a temperature of 50° C which will remain at this value across the regulating valve up to the evaporator. Under these conditions the following heat content values, will apply using as example the standard coolant $CCl_2F_2$ ("Frigen 12" produced by the Hoechst AG):

Upstream of the evaporator (50° C, in liquid form): 111.70 kcal/kg

Downstream of the evaporator (0° C, in gaseous form): 136.43 kcal/kg.

The difference, a measure of the heat transferred in the evaporator from the fluid flow to the refrigeration cycle, amounts to 24.73 kcal/kg.

If the fluid, conveyed from the outside of the building at 5° C, is now brought into heat exchange with the refrigeration cycle between condenser and regulating valve, and the temperature of the coolant is lowered from 50° C to 5° C, the heat content value of the coolant upstream of the evaporator will be: in front of the evaporator (5° C, in liquid state): 101.11 kcal/kg. The difference of this value from the heat content value of the coolant downstream of the evaporator will now be 35.32 kcal/kg (as against 24.73 kcal/kg, the value attained without the use of the counterflow cooling proposed by the invention). This is an increase in heat content difference for the two sides of the evaporator of approximately 43% in case of the example given, which can easily be generalized to show the applicable principle. The quantity of heat extracted from the ambient all and delivered as heating output increases correspondingly.

3. The lowering of the temperature upstream of the evaporator will also decrease the temperature downstream of the evaporator, thereby lowering also the specific volume $v$ of the coolant to be compressed by the compressor. The work to be performed by a compressor can be expressed if mechanical losses and the like are disregarded by the formula $w = \int v\, dp$. This work is therefore reduced when the specific volume $v$ becomes a lower value.

This is a third important result of the above-mentioned counterflow cooling of the refrigeration cycle.

The three advantages are particularly notable because they can be attained without additional use of energy, "free of charge", so to speak.

Liquid fluid flows are especially suitable for the above-discussed counterflow cooling, but it is obviously also possible when the fluid flow consists of air.

The water contained in an existing hot-water heating system can be utilized as one of the fluid flows, thus making unnecessary the installation of a separate piping system inside a building.

In buildings provided with appropriate measuring devices at individual cooling units to measure the cooling output being used, and which during the summer months the cooling output being furnished is utilized for the production of hot water, the measured cooling output can be used as a basis for the allotment of hot water, thus making unnecessary a separate determination of hot water consumption.

The above-mentioned embodiments can be further varied to facilitate heat transfer between flows of fluid in the gaseous and/or liquid state. In any event, the refrigeratian cycle will remain constant and unchangeable, while control of the heating or cooling operation is accomplished by conducting the flows of fluid interchangeably through the condenser or the evaporator. In addition to this basic characteristic, the invention proposes as another significant feature a pipe system within a building which includes either a heat exchanger at the outside of the building, where heat pumps can be connected at various locations inside the building, or which starts out with a heat pump and permits the connection of heat exchangers at various locations inside the building. The latter feature represents a characteristic of independent significance.

Preferred embodiments of the invention will now be described with reference to the attached drawings, in which.

Figure 1:
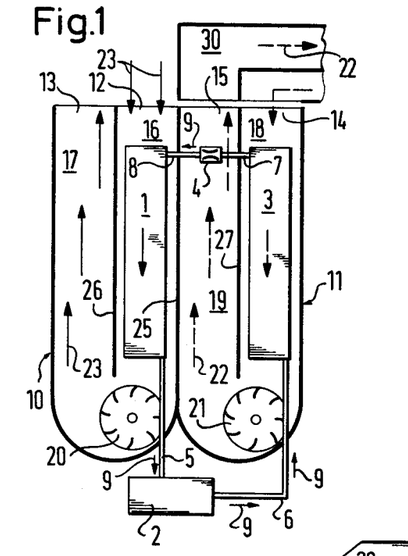
FIGS. 1 and 2 are schematic illustrations of a heat pump for air-air operation according to the invention, in position for cooling and heating operations.
Figure 2:
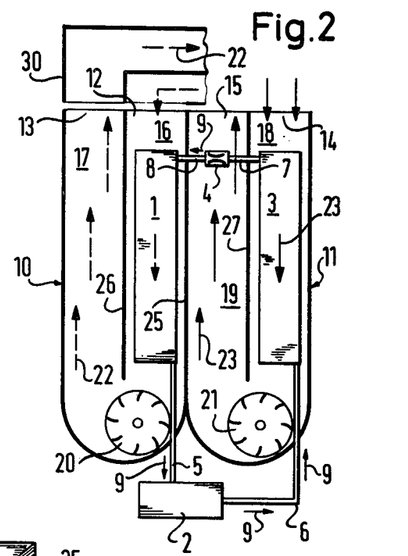

FIGS. 1 and 2 illustrate a heat pump for summer or cooling operation and for winter or heating operation. The refrigeration cycle of this heat pump comprises an evaporator 1, a compressor 2, a condenser 3 and a regulating valve 4 which are connected by way of pipes 5, 6, 7, and 8 (shown in double lines) to form a circulating system. The direction of circulation within this refrigeration cycle is denoted by arrows 9. A comparison between FIGS. 1 and 2 demonstrates that the direction of circulation within the refrigeration cycle does not change upon change-over from summer to winter operation but always remains the same, so that the evaporator always functions as an evaporator, and the condenser as a condenser. A coolant, such as "Fregen", circulates within the refrigeration cycle, which is vaporized in the evaporator 1, thereby extracting heat from the surrounding area, and upon compression by the compressor 2 is then liquefied in the condenser 3, delivering heat to the surrounding area. The evaporator 1 and the condenser 3 are components of heat exchangers 10, 11 which are designed in the form of two interconnected boxes, provided with side by-side in- and outlets 12, 13 and 14, 15, respectively. The air entering through inlets 12, 14 flows within a first chamber 16 or 18, respectively, over the evaporator 1, or condenser 3, which will result in a heat exchange. The air is then deflected by blowers 20, 21 in U-form and reaches the outlets 13, 15 through a second chamber 17, 19.

The air channeled through the heat exchangers 10, 11 forms two separate flows of fluid, one taken from the air outside the building, and the other taken from the air inside the building. The outside air is denoted by arrows 22 with broken lines, and the inside air by arrows 23 with continuous lines.

The switch-over from cooling to heating operation is accomplished according to the invention by connecting the outside air is connected selectively for heat exchange with the heat exchanger 11 (condenser 3) or 10 (evaporator 1), while the inside air enters into heat exchange with the other, remaining heat exchanger 10, 11. A distributor box, shown in FIG. 3, is provided for this purpose.

Figure 3:
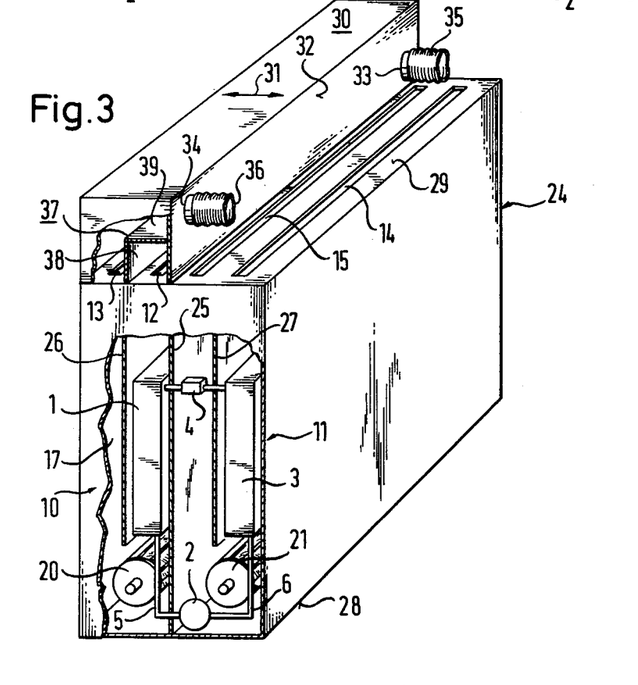
FIG. 3 is a perspective, partly sectioned schematic view of a heat pump as shown in FIG. 2.

FIG. 3 shows a heat pump in accordance with FIGS. 1 and 2, in the position shown in FIG. 2 (heating operation). The heat exchangers 10, 11 with the refrigeration cycle 1, 2, 3, 4 are placed in a box-shaped housing 24. The housing 24 is divided in its longitudinal center plane by a wall 25, with the heat exchangers 10, 11 located on one side each. Parallel to, and at a distance from, both sides of wall 25 are additional walls 26, 27 which terminate at a distance from the bottom 28 of the housing 24 and which form the chambers 16, 17, 18, 19 as shown by FIGS. 1 and 2.

The inlets and outlets 12, 13, 14, 15 of the heat exchangers 10, 11 are arranged within the upper wall 29 in the form of longitudinal slots, with the slots placed in parallel side-by-side.

At the upper wall 29 of the housing 24 is a distributor box 30 which can be moved as indicated by arrow 31. This distributor box 30 is guided on wall 29 (in a manner not illustrated in detail) and covers in its terminal positions either the slot pairs 12, 13 or 14, 15, leaving free in each case the other slot pair. The distributor box 30 is open downwardly in the direction of the slots, and is provided with an inlet 33 within a wall 32 and near its lower edge, and with an outlet 34 near the upper edge of wall 32, the inlet and outlet being connected to tubes 35, 36 or the like. These tubes 35, 36 are in communication with the outside of the building (not shown).

At the inside of the distributor box 30 there is an L-shaped dividing wall 37 which extends throughout the entire length of the distributor box 30. The wall 37 has a vertical side 38 which extends within the lower portion of the distributor box at its longitudinal center line, and a horizontal side 39 which begins at the former and which is connected to the wall 32. In this manner communication is established between the inlet 33 of the distributor box 30 and the inlet 12 of the heat exchanger 10, as well as between the outlet 13 of the heat exchanger 10 and the outlet 34 of the distributor box 30.

FIG. 3 shows that the inlet 14 and the outlet 15 of the heat exchanger 11 are not covered up by the distributor box 30, so that the inside air can be circulated by the heat exchanger 11. The outer air, being in heat exchange with the evaporator 1, will be relatively cooled, while the inside air, being in heat exchange with the condenser 3, will be relatively heated.

Figure 4:
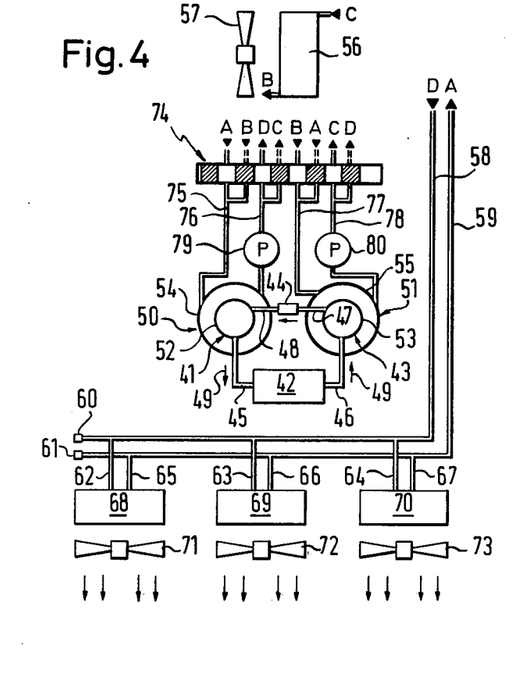
FIGS. 4 and 5 show a further embodiment of a heat pump with a circulating fluid system for cooling and heating operation.
Figure 5:
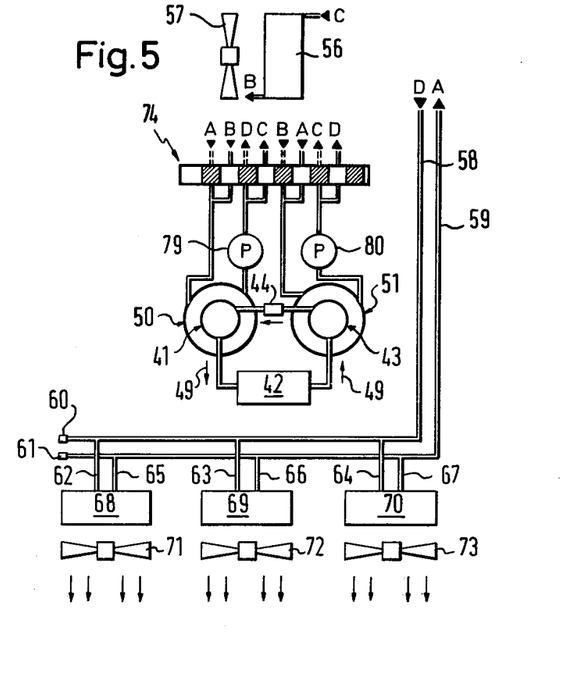

While the flows of fluid which are brought into heat exchange with the condenser and the evaporator of the refrigeration cycle are formed by the outside air and by the inside air of a building in the embodiment illustrated by FIGS. 1 to 3, embodiment of FIGS. 4 and 5 provides for flows of fluid in the form of liquid-circulating systems which will circulate for example a hydrous salt solution (brine). In the embodiment of FIGS. 4 and 5, this brine in turn is in heat exchange with the outside air and the inside air of the building by means of heat exchangers.

The embodiment of FIGS. 4 and 5 does provide a refrigeration cycle, comprising an evaporator 41, a compressor 42, a condenser 43 and a regulating valve 44, as well as pipe lines 45, 46, 47 and 48 which connect the units in such manner that they form a circulating system. The direction of circulation is indicated by arrows 49 (FIG. 4).

Again, the evaporator 41 and the condenser 43 are components of the heat exchangers 50 and 51, indicated in FIGS. 4 and 5 by inner tubes 52, 53, holding the coolant, and concentric outer tubes 54, 55, holding the circulating liquid or brine. Either liquid-circulating system one system containing a heat exchanger at the outside of the building, and the other an heat exchanger at the inside of the building can be switched into heat-exchange contact with the heat exchangers 50, 51 as desired.

The heat exchanger outside the building is shown schematically at the upper portion of FIGS. 4 and 5 and is denoted by numeral 56. This heat exchanger is equipped with a fan 57, has an inlet, denoted by, denoted by C and an outlet B, with the direction of flow being shown by arrows. The liquid-circulating system within the building includes pipes 58, 59, which can be installed for example behind the base boards. The tube 58 has an inlet D, and the tube 59 has an outlet A, with the direction of flow again indicated by arrows. The pipes 58, 59 are closed off at their ends 60, 61. They are equipped at various points with plug junctions (not shown) for coupling with inlet tubes 62, 63, 64 and outlet tubes 65, 66 67 of the heat exchangers 68, 69, 70. The heat exchangers 68, 69, 70 are equipped with fans 71, 72, 73 and can be connected with the pipes 58, 59 at various points inside the building to facilitate the most efficient distribution of heat or refrigerant, especially if larger rooms are involved.

A change-over valve 74 is used to bring the just-discussed circulating systems selectively in contact with the heat exchanger 50 or 51. The inlet pipe 75 of the heat exchanger 50 has two branches, one denoted by A, and the other by B. Branch A is in communication with the outlet A of pipe 59, and branch B with the outlet B of the heat exchanger 56. The change-over valve 74 is designed in such manner that one of the branches A, B is always open, and the other closed. This applies correspondingly to the outlet pipe 76 of the heat exchanger 50 which leads into the branch pipes denoted by D and C, which in turn are in communication with the inlet D of tube 58 and inlet C of the heat exchanger 56. The change-over valve 54 simultaneously controls the inlet 77 and the outlet 78 of the other heat exchanger 51: for example, if at heat exchanger 50 the branch A is open and the branch B is closed, branch A will be closed and branch B will be open at heat exchanger 51. This automatically assures that the tubes 58, 59 are in any given case in communication with one of heat exchangers 50, 51, and heat exchanger 56 with the other of heat exchangers 50, 51.

FIG. 4 shows the pipes 58, 59 in heat exchange with the evaporator 41, thus cooling the liquid within the pipes, and consequently also cooling the interior of the building. The heat exchanger 56 outside the building is connected with the condenser 43. In other words, this figure illustrates the summer operation, with FIG. 5 showing the corresponding winter operation.

Figure 6:
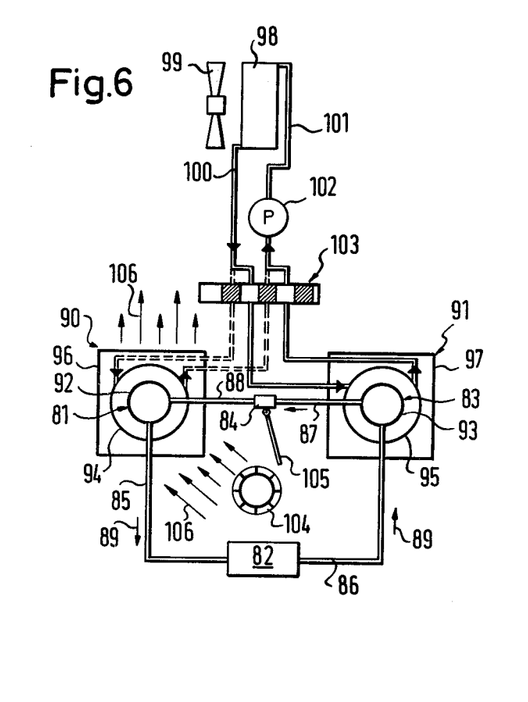
FIGS. 6 and 7 show an embodiment of a heat pump according to the invention with one liquid and one air cycle for cooling and heating operation.
Figure 7:
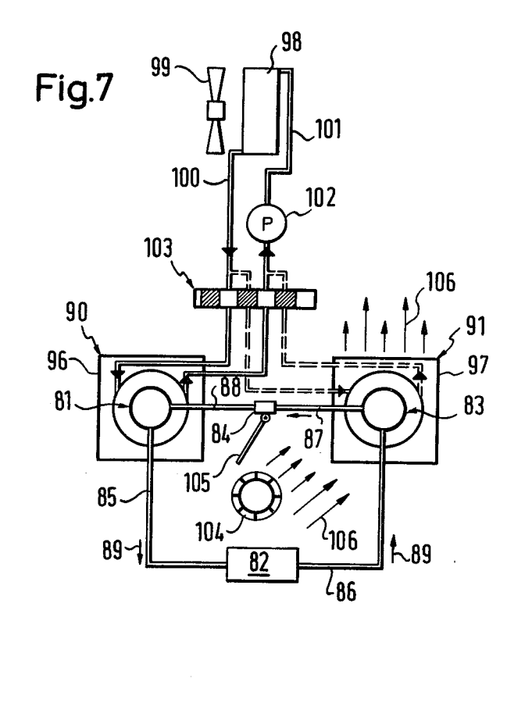

The embodiment illustrated by FIGS. 6 and 7 is a combination of the first two embodiments described above, to the extent that one of the fluid flows is formed by a liquid-circulating system, and the other by the inside air of a room. Again, a constant refrigeration cycle is provided with an evaporator 81, a compressor 82, a condenser 83 and a regulating valve 84, connected with each other by pipe lines 85, 86, 87 and 88 to form a circulating system. The arrows 89 indicate the direction of circulation within the refrigeration cycle. The evaporator 81 and the condenser 83 are designed as heat exchangers 90, 91, facilitating heat exchange with the liquid-circulating system as well as with the inside air of the room. They comprise an inner pipe 92 and 93 to hold the coolant, an outer pipe 94, 95, surrounding the latter concentrically, and a reflecting housing 96, 97, for example of aluminum, surrounding the outer pipe. The liquid-circulating system contains a heat exchanger 98 with a fan 99, located at the outside of a building. The heat exchanger 98 is connected by means of an outlet pipe 100 and an inlet pipe 101, the latter being equipped with a pump 102. The outlet pipe 100 and the inlet pipe 101 each end in two branches, one of which always communicates with the outer pipe 94, 95 of the heat exchanger 90, 91. A change-over valve 103, which is almost identical with the change-over valve 74 shown in FIGS. 4 and 5, blocks one of the branches of outlet pipe 100 and of inlet pipe 101 while opening the other branch, so that the outlet pipe 100 and the inlet pipe 101 are both connected either with the heat exchanger 90 or the heat exchanger 91 but are blocked off from the other heat exchanger, as the case may be. A blower 104 draws in the air inside a building, directing its flow, in accordance with the position of a flap 105, against reflecting housing 96, 97 of that heat exchanger 90, 91 which is not subjected to the flow of the liquid-circulating system. The direction of flow of the inside air is indicated by the arrows 106. FIG. 6 shows the system in cooling position, while FIG. 7 illustrates the heating operation. This system provides a particularly simple heat pump, and the heat exchanger 98 at the outside of the building can be so dimensioned that it can be combined with two or more heat pumps.

Figures 8, 9:
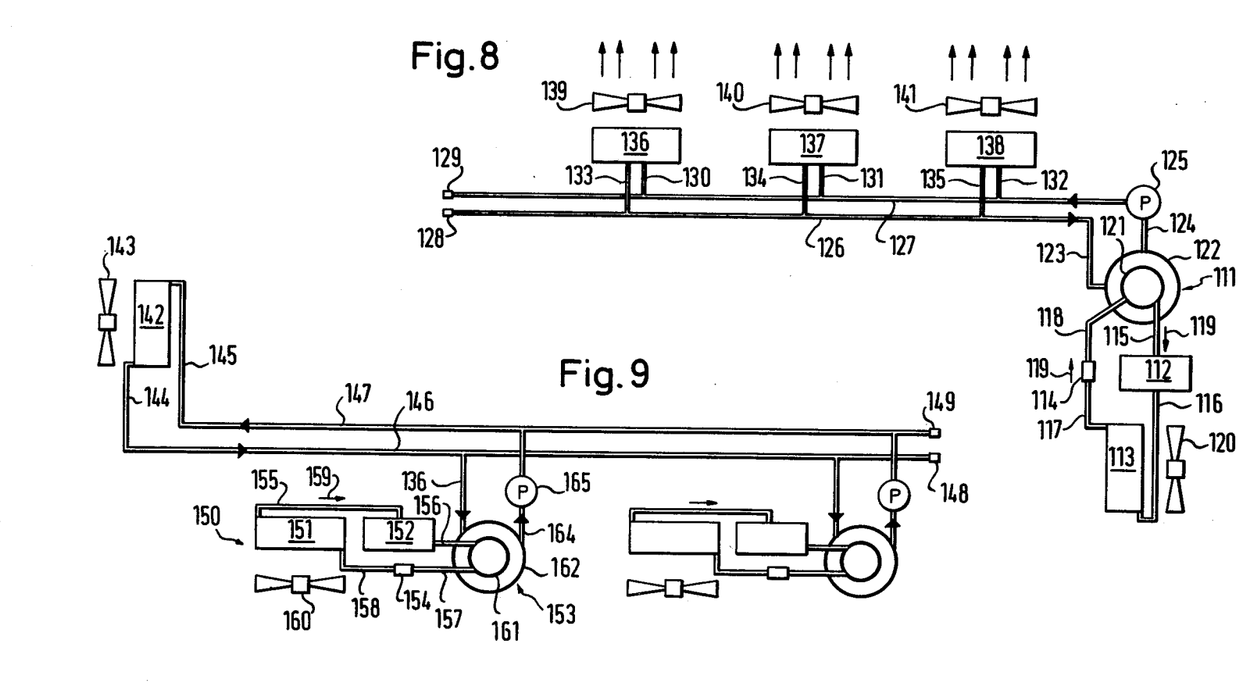
FIG. 8 shows a heat pump in cooling position with a pipe system and heat exchangers to be connected thereto.
FIG. 9 shows a pipe system in heat exchange with the outside air, carrying a liquid medium, with heat pumps to be connected to the system.

FIG. 8 shows a heat pump with an evaporator 111, a compressor 112, a condenser 113 and a regulating valve 114, connected by pipe lines 115, 116, 117, 118 to form a refrigeration cycle, with the direction of circulation indicated by the arrows 19. The condenser 113 is equipped with a fan 120. At least the condenser 113, or even the entire heat pump are placed at the outside of a building, and the condenser 113 will be in heat exchange with the outside air. The evaporator 111 forms a heat exchanger and includes an inner piipe 121 and an outer pipe 122 surrounding the latter concentrically. The inner pipe 121 hold the coolant, and the outer pipe a liquid (brine) which enters the outer pipe by way of an inlet pipe 123 and leaves it through an outlet pipe 124. A pump 125 is placed within the outlet pipe 124. The inlet pipe 123 and the outlet pipe 124 are connected to two pipes 126, 127 which are installed inside a building in the form of a pipe system, this system extending throughout the building as desired, with the ends 128 and 129 closed off. It is possible, as explained above in connection with FIGS. 4 and 5, to connect the inlet pipes 130, 131 and 132 and the outlet pipes 133, 134, 135 of heat exchangers 136, 137 and 138, to these pipes 126, 127 of selected locations by suitable sockets (not shown), thereby completing and closing the circulating system. In this manner it is feasible to air-condition selected areas of a building as desired. The heat exchangers 136, 137 and 138 are equipped with fans 139, 140 and 141 to circulate the inside air as shown by arrows.

While the heat pump shown in FIG. 8 is only in the form of a cooling system, it can, like the other embodiments, also be provided with a change-over device for summer or winter operations. The pipe system 126, 127 with the heat exchangers 136, 137, 138 which can be connected as desired, can be employed advantageously for pure cooling or heating installations also.

FIG. 9 shows the principle of FIG. 8 in reverse. While in FIG. 8 the heat pump is arranged at the outside of the building and is connected, for the purpose of air-conditioning the inside of the building, by way of a liquid-circulating system with heat exchangers located inside the building, FIG. 9 shows a heat exchanger 142 which is located at the outside of a building, with two or three heat pumps arranged inside the building. The heat exchanger 142 is equipped with a fan 143. The heat exchanger 142 is connected by way of outlet pipe 144 and inlet pipe 145 with pipes 146, 147 which form a pipe system that can be installed throughout the building as desired, for example behind the base boards, as described in connection with FIG. 8. The pipes 146, 147 are again closed off at their ends 148, 149. Heat pumps can be coupled to the pipes 146, 147, as will be explained below. The two heat pumps illustrated in FIG. 9, are identical, so that only the left hand pumps will be described in detail. There is no limit to the number of such heat pumps which can be connected to the pipes 146, 147 at various locations.

The heat pump 150 comprises an evaporator 151, a compressor 152, a condenser 153 and a regulating valve 154, and these units are connected by pipe lines 155, 156, 157, 158 to form a closed refrigeration cycle, with the direction of circulation indicated by arrow 159.

In this example evaporator 151 is designed as heat exchanger, equipped with a fan 160, and in heat exchange with the inside air of the building. The condenser 153 is a heat exchanger with one inner pipe 161 and one outer pipe 162. The inner pipe 161 holds, the coolant previously described, while the outer pipe 162 is connected with the pipes 146, 147 by way of an inlet pipe 163 and an outlet pipe 164. A pump 165 is located within the outlet pipe 164. In this embodiment, the liquid (brine) cooled in the heat exchanger 142 is utilized to liquefy the coolant in the condenser 153. The coolant is then varpoized again in the evaporator 151 to cool the air inside the building. Here again, as in case of the embodiments shown in FIGS. 4, 5 and 8, it becomes possible to place and connect small, compact heating and cooling units at any desired location within a building, a particularly advantageous feature of the invention. This results in an outstandingly advantageous distribution of small quantities of heat or refrigerant, a system which is much healthier and results in a more uniform temperature distribution than any central air conditioning installation.

The embodiments shown in FIG. 9 can also be used as heating system, namely by reversing the heat exchange of the two flows of fluid (liquid-circulating system and inside air of the room) with the evaporator and the condenser.

Figure 10:
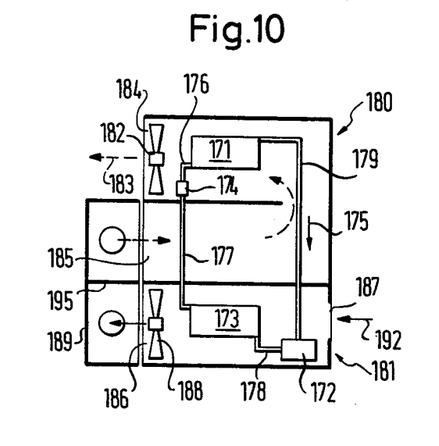
FIGS. 10, 11 show schematically a further preferred embodiment of a heat pump in accordance with the invention, which permits simultaneous a ventilation of the interior of a building during the summer.
Figure 11:
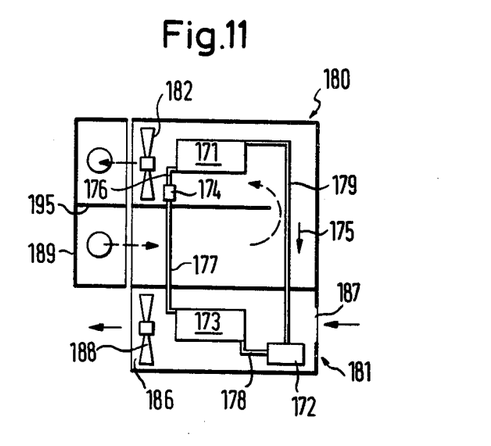
Figure 12:
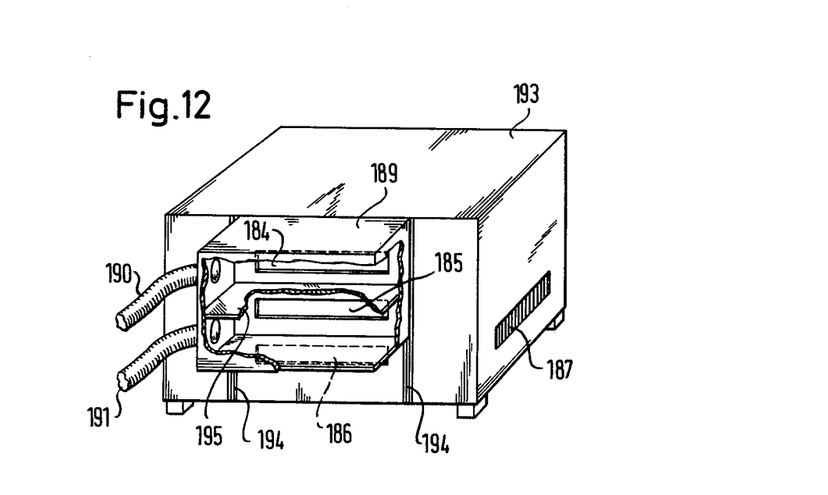
FIG. 12 is a perspective, partly sectioned view of the heat pump according to FIGS. 10 and 11.

The embodiments shown in FIGS. 10 to 12 differs from the arrangements described above primarily in that here the flows of fluid do not form fully closed circulating systems, or at least return to their original place of removal (outside air to outside air, inside air to inside air) but rather become transposed under cetain conditions. Otherwise, the design of the embodiment of FIGS. 10 to 12 is generally identical with that of FIGS. 1 to 3. The heat pump comprises a refrigeration cycle with an evaporator 171, a compressor 172, a condenser 173 and a regulating valve 174, where the coolant circulates through the pipe lines 176, 177, 178 and 179 always in one direction as indicated by the arrow 175. The evaporator 171 and the condenser 173 are located in the heat exchangers 180 and 181. The heat exchanger 180 is substantially identical with the heat exchanger 10 shown in FIGS. 1 and 2. A blower 182 is used to circulate air in the manner indicated by broken-line arrows 183. The outlet 184 and the inlet 185 of the heat exchanger 180, as well as the outlet 186 of the adjacent heat exchanger 181, are again located side-by-side in the form of parallel slots, while the inlet 187 of the heat exchanger 181 has a different location, namely opposite to the outlet 186. A blower 188 circulates air through the heat exchanger 181. A distributor box 189 can be moved across the outlet 184, the inlet 185 and the outlet 186 to two terminal positions, at which is will cover either outlet and inlet of the heat exchanger 180 (as in FIG. 11), or the inlet of the heat exchanger 180 and the outlet of the heat exchanger 181. Box 189 comprises two separate chambers which are in communication with the outside air by way of tubes 190, 191. In this embodiment, the position of the distributor box 189 as shown in FIG. 11 corresponds to the position of the distributor box 30 as shown in FIG. 2, and there are therefore no differences between the two arrangements. However, in the position illustrated by FIG. 10, stale inside air is withdrawn in the direction of arrow 192 and moved to the exterior by way of the heat exchanger 181 and the distributor box 189, while fresh air is drawn in from outside by way of the distributor box 189 and the heat exchanger 180, and is cooled and delivered into the room in the direction indicated by the arrow 183. This embodiment thus permits ventilation of the interior of a building during summer operation as shown in FIG. 10. As already mentioned, the volume of air being circulated for cooling purposes is also sufficient to meet the ventilation standards for public places and the like.

FIG. 12 shows the heat pump of FIGS. 10 and 11 in a partly sectioned plan. A box-shaped housing 193 has in its front wall three slots, arranged parallel and side-by-side, representing the outlet 184, the inlet 185 and the outlet 186. The distributor box 189 is movably arranged in front of these slots within guides 194 (not shown in detail). FIG. 12 shows the distributor box 189 in its position above the outlet 184 and the inlet 185 of the heat exchanger 180 which contains the evaporator 171 and which cools the air flowing through it. In the position shown, the unit is set for winter- or heating operation. The air is drawn in from the room through the inlet 187, shown at the side of the box, and returned through the outlet 186. The distributor box is partialy opened up in the drawing, and the dividing wall 195 is also cut away in part in order to show the outlet 185. This embodiment of the invention is not only extraordinarily simple and compact in its construction but also permits in addition of the heating or cooling, ventilation by use of fresh air during summer operation.

It will be expedient to provide the compressor in the heat exchanger which contains the condenser because it then becomes possible to dispose of, and; if appropriate, to utilize the specific heat of the compressor, as illustrated in FIGS. 10 and 11. The heat pump of the invention can be controlled in a very simple manner by placing into the inlet 185 for the outside air a thermostat not shown in FIGS. 10 and 11, to influence an injection valve which is arranged downstream of the evaporator and which takes over the function of the regulating valve.

Figure 13:
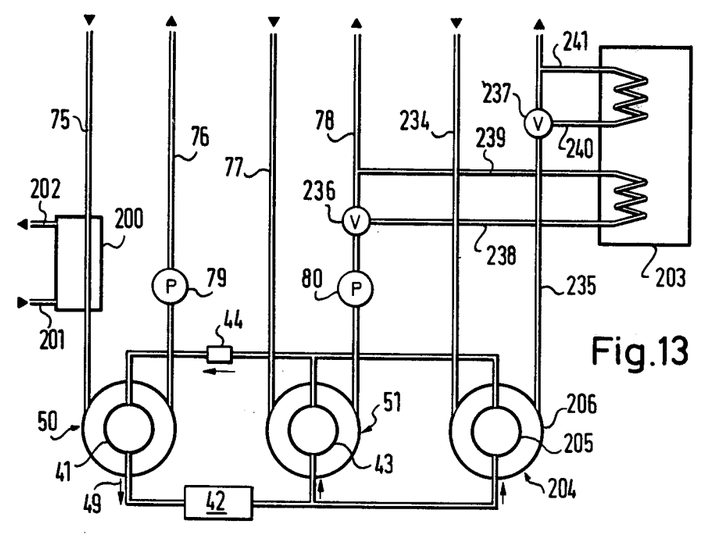
FIG. 13 shows a heat pump as illustrated in FIGS. 4 and 5 with additional heating and heat exchanger utilizing household waste water.

FIG. 13 shows in enlarged scale a portion of FIGS. 4 and 5, namely the area of the heat pump.

The refrigeration cycle 41, 42, 43, 44 again runs continuously and in one direction, and the flows of fluid are in contact by way of the inlet and outlet pipes 75, 76 and 77, 78 with the heat exchangers 50 and 51 which contain the evaporator 41 and the condenser 43 of the refrigeration cycle. Any further details can be found in FIGS. 4 and 5.

FIG. 13 shows, in addition to the arrangement shown in FIGS. 4 and 5, a heat exchanger 200 in the inlet pipe line 75 of the heat exchanger 50. This heat exchanger 200 is utilized only for winter operation (FIG. 5). It is used to heat the liquid drawn in through the inlet pipe 75 of the heat exchanger 56 at the outside of the building, with the aid of household waste water which is circulated through the pipes 201 and 202. The temperature of household waste water will, at least during normal winter operation, be higher than the outside temperature, which is also the temperature of the liquid drawn in by the inlet pipe 75. If this liquid is pre-heated by household waste water, the difference in temperature to be overcome within the refrigeration cycle will be reduced in magnitude, and the thermal efficiency of the cycle will be improved.

FIG. 13 further shows a supplemental heating system which can be activated in case of extremely low outside temperatures. It is possible for example to set and control the supplemental heat in such a manner that 95% of the heating output is provided by the heat pump, with the remaining 5% being supplied by the supplemental heating system. The supplemental heating can take the form of a simple electric heating coil (not shown) within the heat exchanger 51. FIG. 13 shows a supplemental heating device in the form of a burner 203 which can be an already existing or a specially installed oil burner, or a gas burner, coke burner or the like.

In the example shown, there an additional heat exchanger 204, provided with an inner tube 205 and an outer tube 206 is installed in the refrigeration cycle, parallel to the heat exchanger 51. The inner pipe 205 holds the coolant, and the outer pipe 206 is in communication with the pipes 234, 235 which carry water supply for a household, while the heating water is circulated in the pipes 77 and 78. Pipes 78 and 235, emerging from the heat exchangers 51 and 204, are equipped with valves 236 and 237 which make it possible to circulate the heating water and the household water completely or in part by way of pipes 238, 239, 240 and 241 and the burner 203, and return the water to pipes 78, 235 for additional heating.

Figure 14:
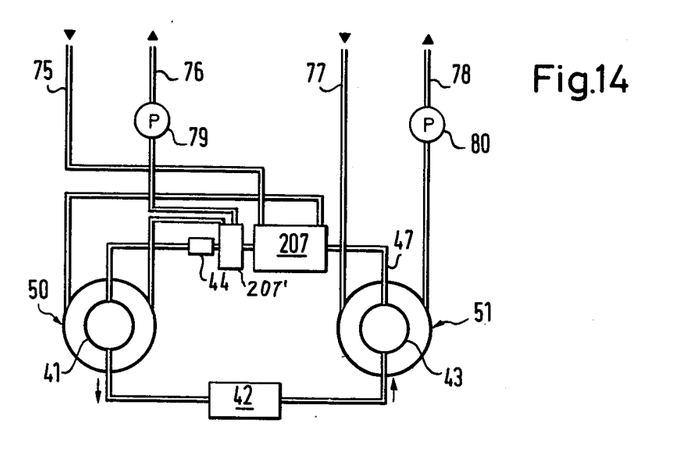
FIG. 14 shows a heat pump similar to FIG. 13 with counterflow cooling in the refrigeration cycle.

FIG. 14 is also based on the arrangement shown by FIGS. 4 and 5, and illustrates a portion of the refrigeration cycle 41, 42, 43, 44. The system is shown as a heating operation. Pipe 47 is surrounded between the condenser 43 and the regulating valve 44 by a heat exchanger or counterflow cooler 207, with the inlet pipe 75 of the heat exchanger 50 passing in counterflow through the cooler. This counterflow cooler 207 has the effect that the liquid which is present in the pipe 75 and which is being conducted from the exterior of the building is heated, and that the coolant of the refrigeration cycle is cooled between the condenser and the regulating valve. This cooling of the coolant between condenser and regulating valve, used heretofore only in connection with refrigerators for the purpose of increasing the cooling output of the evaporator, has been found to be extremely advantageous within the framework of the invention also, and especially, during the heating operation of the heat pump. The advantages of this specific solution have already been discussed in detail.

A further improvement of the heat pump can be obtained by bringing conduit 76 leaving heat exchanger 50 into heat exchange with the refrigeration cycle between counterflow cooler 207 and regulating valve 44. The temperature of the coolant is thereby further reduced upstream of evaporator 41, so that the aforementioned advantages are obtained, and the fluid in conduit 46 is heated, so that a smaller heat exchanger 56 (FIGS. 4 and 5) can be used on the exterior.

Figure 15:
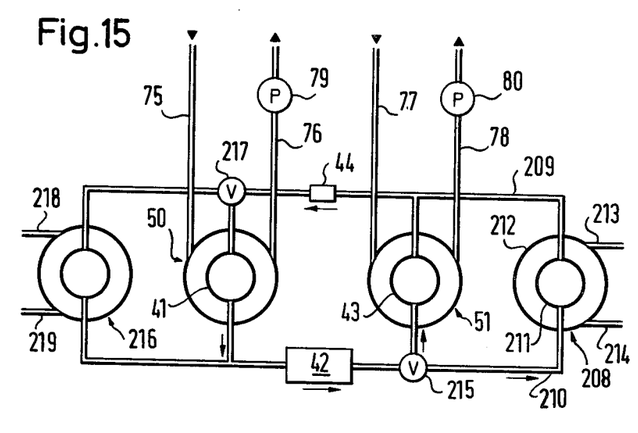
FIG. 15 shows the utilization of unused heat or refrigerant for the heating of water or the operation of a refrigeration unit.

FIG. 15 again shows the refrigeration cycle of FIGS. 4 and 5 and demonstrates two possibilities for the utilization of the refrigerant or the heat which becomes available during the heating or cooling of a room. During the cooling operation (FIG. 4), liquid from the heat exchanger 56 is located at the outside of the building is drawn up through the inlet pipe 77, and upon its passage through the heat exchanger 51 is then returned to the outside by the outlet pipe 78 at higher temperature. This increase in temperature, a by-product of the cooling process, can be utilized, for example in heating water used for household use. FIG. 15 shows schematically a hot water preparer 208 which can be used for this purpose. It represents in principle a heat exchanger similar to the heat exchanger 51 in the refrigeration cycle, and it is incorporated into the cycle in parallel to the exchanger 51 by way of pipe sections 209, 210. It comprises, for example, an inner pipe 211, interconnected with the refrigeration cycle, and an outer pipe 212, concentrically surrounding the inner pipe, carrying warm household water. Two pipes 213 and 214 are in communication with the outer pipe 212 and serve to deliver and to return the household water to be heated. A valve 215 in the refrigeration system permits the coolant to run selectively either through the heat exchanger 51, or through the hot water preparer 208, or through both in pro rata distribution.

At the left side of FIG. 15 an additional heat exchanger 216 is shown, which is incorporated into the refrigeraton cycle in parallel with the heat exchanger 50 and its evaporator and which can be activated selectively by means of a valve 217. This heat exchanger 216 which, like the heat exchanger 50, extracts heat from its surroundings by the vaporization of the coolant, can be utilized to cool during heating operation by the heat pump a fluid which is being supplied and then removed by way of pipes 218 and 219, thus utilizing this heat exchanger 216 as a cooling unit.

Figure 16:
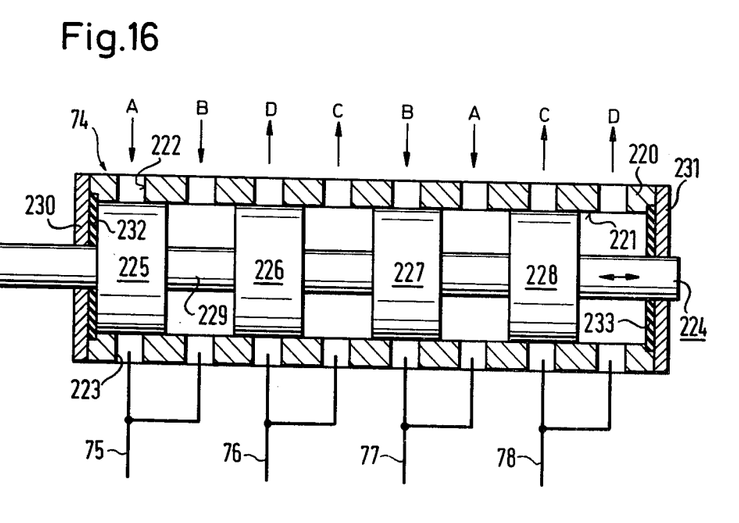
FIG. 16 shows a longitudinal cross section through a change-over valve as illustrated in FIGS. 4 and 5.

FIG. 16 shows an embodiment of a switch-over valve 74 as used in FIGS. 4 and 5 which permits a switching of the two flows of fluid which are to be placed alternatively in contact with the heat exchangers 50, 51. The switch-over valve 74 comprises an extended rectangular or cylindrical housing 220 with an axial bore 221 which extends through the entire housing. The housing 220 is entered by bores 222 and 223, each set of bores entering from diametrically opposite sides, and which are connected as shown in FIGS. 4 and 5 at one side to the inlets or outlets A, B, C, D, and at the other side to the branches of the pipe lines 75, 76, 77, 78. Within the axial bore 221 of the housing 220 there is placed an axially movable slide bar 224 which is provided with cylindrical sections 225, 226, 227, 228 which fit closely into the axial bore 221 and which are at a distance from each other that equals twice the distance between two bores 222, 223. These cylindrical sections 225 to 228 are interconnected by a thinner shaft 229 to form one single unit. The cylindrical sections 225 to 228 will block the passage for every other pair of the diametrically opposed bores 222, 223 while allowing a communication between the pairs of bores located next to the blocked pairs, so that, in the example shown, there are always four pairs of bores unobstructed and four pairs blocked. The position shown in FIG. 16 corresponds to that shown in FIG. 5, i.e., the heating group of bore pairs will be blocked. At the ends of housing 220, there are placed the covers 230, 231 with the gaskets 232, 233 are provided in a manner not illustrated in detail.

The flows of liquids which are utilized primarily in the embodiments of the invention for the transfer of heat or refrigerant from the outside air to the heat pump, or from the heat pump to the place of use, offer the advantage, in comparison with the direct utilization of outside air and inside air as the two fluids being brought into heat exchange with the heat pump, that in contrast to our-carrying systems, there is no danger of freezing within the pipe systems of these liquids.

We claim:
1. Method for the transfer of heat or refrigerant between two separate flows of fluid by means of a heat pump comprising a refrigeration cycle having an evaporator, a compressor, a condenser, and a regulating valve, including the steps of
   a. providing heat exchange between the separate flows of fluid and said evaporator and condenser;
   b. bringing one of said fluid flows during heating operation and prior to entering the evaporator into heat exchange in a first heat exchanger with the refrigeration cycle; and
   c. making said heat exchange in an area between the condenser and the regulating valve.
2. Method according to claim 1, including the additional step of bringing one of said flows of fluid, during heating operation and after leaving the evaporation, into heat exchange in a second heat exchanger with the refrigeration cycle between the condenser and the regulating valve.
3. Method according to claim 1, including the additional step of bringing one of said flows of fluid, during heating operation and after leaving the evaporator, into heat exchange in a second heat exchanger with the refrigeration cycle between the said first heat exchanger and the regulating valve.

* * * * *